United States Patent [19]
Tobey et al.

[11] Patent Number: 5,510,811
[45] Date of Patent: Apr. 23, 1996

[54] APPARATUS AND METHOD FOR CONTROLLING CURSOR MOVEMENT

[75] Inventors: Chris E. Tobey, Seattle; Yung-Ho Shih, Bellevue; Michael B. Robin, Redmond; Wesley O. Rupel, Bellevue; Michael D. Edwards; Terence R. Spies, both of Redmond; James C. Bovee, Jr., Bothell; Robert B. Seidensticker, Jr., Redmond; Mark R. McCulley, Seattle, all of Wash.

[73] Assignee: Microsoft Corporation, Redmond, Wash.

[21] Appl. No.: 982,097

[22] Filed: Nov. 25, 1992

[51] Int. Cl.$^6$ .................................................. G09G 5/08
[52] U.S. Cl. .......................... 345/157; 345/160; 345/169
[58] Field of Search ..................................... 345/157, 158, 345/159, 160, 169, 172

[56] References Cited

U.S. PATENT DOCUMENTS

| | | | |
|---|---|---|---|
| 4,202,240 | 5/1985 | Swindler | 345/157 |
| 4,654,647 | 3/1987 | Wedam | 345/157 |
| 4,786,895 | 11/1988 | Castaneda | 345/160 |
| 4,803,474 | 2/1989 | Kulp . | |
| 5,101,197 | 3/1992 | Hix et al. | 345/157 |
| 5,259,626 | 11/1993 | Ho | 345/157 |

FOREIGN PATENT DOCUMENTS

| | | | |
|---|---|---|---|
| 59-106037 | 6/1984 | Japan | 345/160 |
| 59-139435 | 8/1984 | Japan | 345/160 |
| 60-037029 | 2/1985 | Japan . | |
| 63-232794 | 9/1988 | Japan . | |
| 4292082 | 10/1992 | Japan . | |

OTHER PUBLICATIONS

J. A. Williams, "Keyboard Cursor Control Layout", IBM Technical Disclosure Bulletin, vol. 26, No. 4, Sep. 1983.
A. J. Hawes and K. T. Jarzebowski, "Smooth Travel of Crosshair Cursor on Display Screen," IBM Technical Disclosure Bulletin, 26:2, Jul. 1983, pp. 473–476.
"Wireless Mouse," IBM Technical Disclosure Bulletin, 31:10, Mar. 1989, pp. 28–29.

Primary Examiner—Richard A. Hjerpe
Assistant Examiner—Matthew Luu
Attorney, Agent, or Firm—Seed and Berry

[57] ABSTRACT

An apparatus and method for navigating through an application program on a computer coupled to a computer-controlled display screen. The user can control the cursor position on the computer-controlled display using simple controls. The invention may use a hand-held controller with a four direction control button and a function select button. The computer accepts the direction input information and moves the cursor or focus according to one of three different navigation functions. The first two navigation functions are selected by the application program, and may change from one navigation to another in different portions of the program or under user control. With the first navigation function, the direction buttons on the controller shift the focus from one hot spot to another hot spot in the selected direction using predefined criteria. With the second navigation function, the focus is shifted from a present position on the computer-controlled display to the adjacent position in the selected direction. If the function select button is depressed while the focus is on a hot spot, the function associated with that particular hot spot are enabled. A third navigation function is enabled if the function select button and the directional control button are both depressed. With the third navigational function, the focus moves from the current position in any direction selected by the directional control button. The focus movement may simultaneously occur in two dimensions using any of the navigational functions if the user selects directions in two dimensions on the four directional control button.

34 Claims, 10 Drawing Sheets

APPARATUS AND METHOD FOR CONTROLLING CURSOR MOVEMENT

TECHNICAL FIELD

The present invention relates to the field of computer-controlled displays and, more particularly, to an apparatus and method for controlling the navigation through an application program using a controller and a computer-controlled display.

BACKGROUND OF THE INVENTION

Computers have become common in both the work place and the home for processing and storing large amounts of data. Storage, retrieval and processing of data generally requires skill in the art of computer operation and computer commands. Computer data bases are used in the home environment with increasing frequency. A data base may include information such as a dictionary, an encyclopedia, a home inventory, investment information, and the like. Despite the widespread use of computers, many people are uncomfortable using computers because of a lack of familiarity with the computer technology, especially computer commands.

To help people overcome their fear of computer technology and to simplify the operation of computers, manufacturers have attempted to simplify the operating systems that control the functions of computers, and to create new techniques to minimize the sophisticated command structure the user must know to operate computers effectively. The use of icons to represent computer commands and functions in the Windows™ operating system is an example of a simplified operating system. Other computer systems have simplified control systems to allow people without computer programming skill to effectively use computers. Computer controlled video games are an example of computers that require little or no computer programming skills.

Despite the simplification of operating systems, it may still be difficult for a user with little or no computer operating experience to navigate through an application program. Therefore, it can be appreciated that there is a significant need for a system and method to allow the easy navigation through an application program without the need for extensive computer operating experience.

SUMMARY OF THE INVENTION

The present invention is embodied in a system having a function select button and directional control buttons to control and application program. The application program uses first and second navigation modes and the direction control buttons move the cursor in a desired direction of movement according to the two operational modes. When only the direction control button is depressed, the cursor jumps from a current focused hot spot to a new hot spot in the selected direction if the application program is in the first mode. If the application program is in the second mode, the cursor moves in a uniform incremental fashion in the selected direction. When only the function select button is depressed, the computer performs some action based on the focused hot spot and the specific application program. If both the function select button and the direction control button are depressed simultaneously, the cursor continuously moves in the selected direction so long as both button are depressed. The user may change directions of cursor movement by selecting a different position on the direction control buttons. If the function select button is pressed and held, then pressing a directional control causes multiple function select button presses to be registered.

In one embodiment, the controls are in a hand-held controller that may be connected directly to the computer or remotely coupled by radio frequency or infrared signals. Two directions may be simultaneously selected by depressing two directions on the direction control button.

DETAILED DESCRIPTION OF THE INVENTION

The present invention provides an system and method to simplify the navigation through an application program using a simplified controller and a computer-controlled display. The invention minimizes the number of buttons required to control application program, and simplifies the appearance of the control buttons so that a person with little or no experience may effectively use a computer.

A typical prior art computer system uses a keyboard or pointing device such as a mouse, joystick, or trackball to control the movement of a cursor or other screen highlight on a computer-controlled display. One application of the computer stores information in a database. The present invention provides a system and method that simplifies the operation of the computer in a variety of applications. The invention provides a means for navigating on the computer-controlled display. The navigation may involve moving of a cursor or some other form of screen highlight. The cursor is a movable marker used to indicate a position on a display space. The term "cursor" as used herein includes any form of movable marker such as an arrow, a screen highlight, a screen focus, or the like. The present invention uses "hot spots" on the computer-controlled display to allow the user to select commands or control the movement of the cursor. A hot spot is a predefined area on the computer-controlled display. The present invention "focuses" on a hot spot; the steps taken by the computer in response to focusing on a particular hot spot depend on the particular application program.

Figure 1:
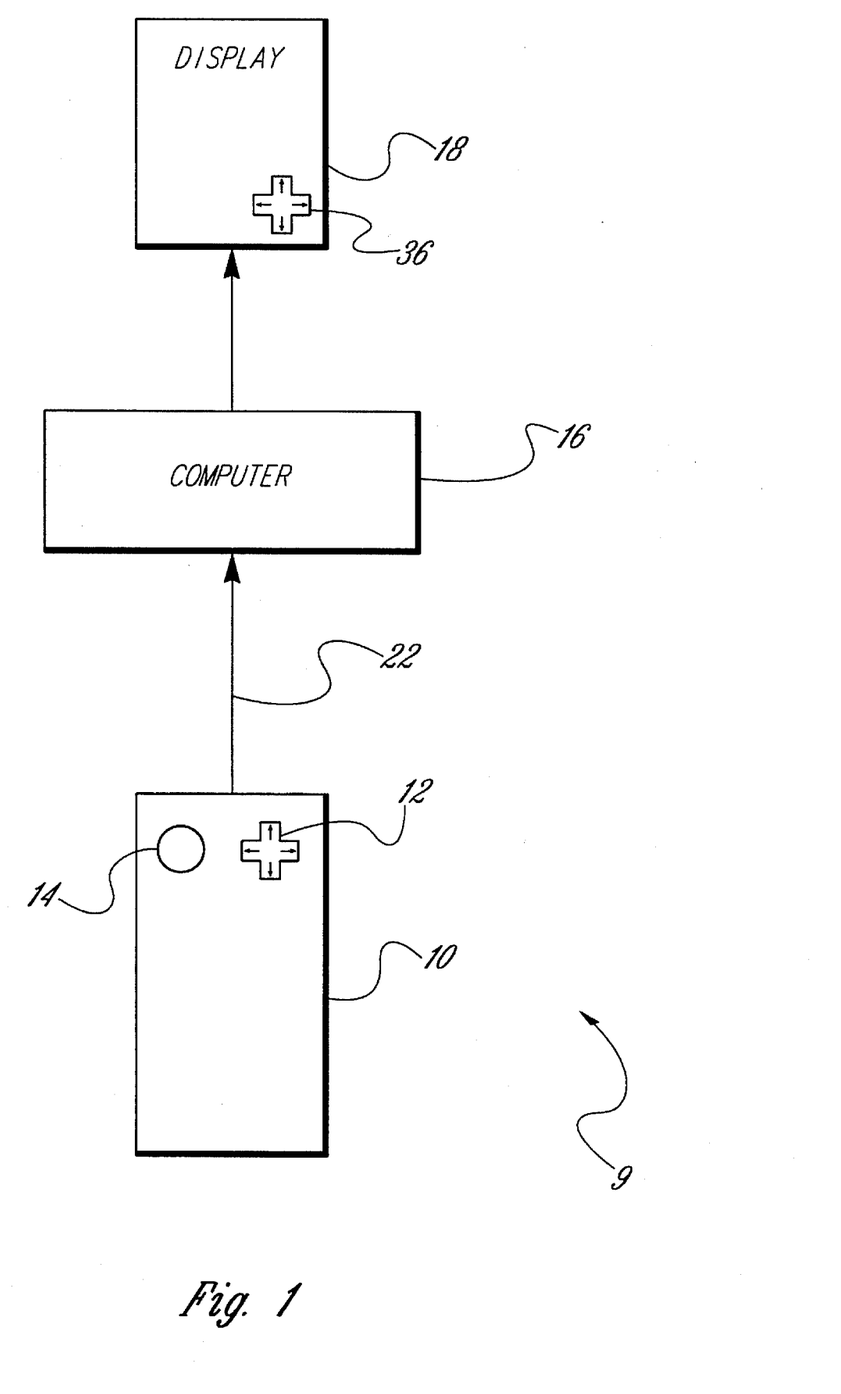
FIG. 1 illustrates a hand-held controller used with the present invention.

To aid the user in navigating on the computer-controlled display, a system 9 of the present invention uses a hand-held controller 10 shown in FIG. 1. The hand-held controller 10 contains a four direction control button 12 to allow the user to select the desired hot spot. The four direction control button 12 comprises four separate arrow button portions indicating the four orthogonal directions of a typical Cartesian coordinate system. That is, the four possible directions are left, fight, up, and down. The hand-held controller 10 also includes a function control button 14 which allows the user to select functions and to enter commands into a computer 16 to which the hand-held controller 10 is coupled. The computer 16 is coupled to a computer-controlled video display 18.

The hand-held controller 10 may be physically connected to the computer 16 or remotely coupled to the computer 16 such as by a radio frequency transmitter or an infrared transmitter as is common in television remote controls. If directly connected, as seen in the functional block diagram of FIG. 2, the hand-held controller 10 includes a transmitter 20 which transmits the data, such as the position of the four direction control button 12 and the function control button 14, through a transmission line 22 to a receiver 24 in the computer 16. If the transmission line 22 is a hardwired electric cable or optical cable, the transmitter 20 and the receiver 24 may be simple connectors or optical couplers. If remotely coupled, the transmitter 20 is a radio frequency transmitter or an infrared transmitter, the radio frequency energy or the infrared light beam carries the data from the hand-held controller 10 to the computer 16 instead of the transmission line 22, and the receiver 24 is a radio frequency or infrared receiver. As is obvious to those skilled in the art, other means, such as ultrasound, may be used to transmit data from the hand-held controller 10 to the computer 16. The methods of transmission listed above are illustrative only and should not be considered limitations on the present invention.

Figure 2:
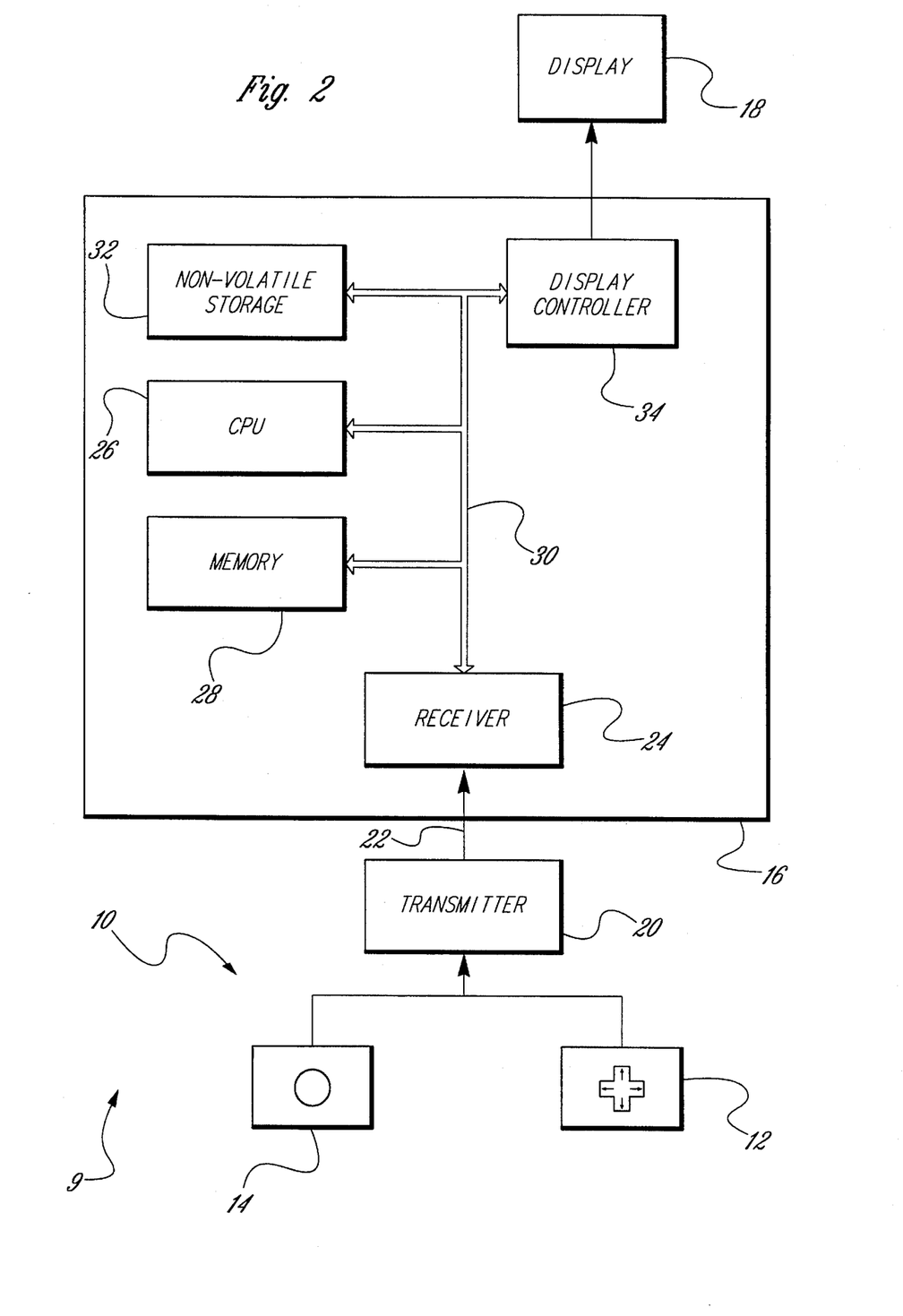
FIG. 2 is a functional block diagram of the inventive system, including the hand-held controller of FIG. 1.

The computer 16 receives the data concerning the position of the four direction control button 12 and the function control button 14, and processes the data in the manner described below. Internal components of the computer 16 include a central processing unit (CPU) 26 and a memory 28, which are connected together by a data bus 30. A non-volatile storage unit 32 such as a hard disk, CD-ROM, or the like is also coupled to the CPU 26 by the data bus 30. A display controller 34 is coupled to the CPU 26 by the data bus 30 and receives data for display on the computer-controlled display 18. The display controller 34 formats the data into a format for use on the computer-controlled display 18. The display controller 34 also generates the timing signals required for proper operation of the computer-controlled display 18.

There are three navigation functions that control the application program running on the computer 16. All three navigation functions may be controlled with the same had-held controller 10 using the function control button 14 and the four direction control button 12, depending on the position of the function control button and four direction control button. The application program running on the computer 16 determines whether the present invention will operate in a "Tabbing" mode or a "Random Roam" mode. Some application programs switch between the two modes. In addition to the Tabbing and Random Roam modes, the present invention also provides a "Power" mode to accelerate use of the function control button 14.

If the function control button 14 is not depressed by the user, the cursor or focus is moved on the computer-controlled display 18, in either the Tabbing mode or the Random Roam mode, by using the four direction control button 12. If the function control button 14 is depressed by the user, the computer 16 takes some action depending on the hot spot currently in focus. As previously discussed, the specific action taken by the computer 16 depends on the particular application running on the computer.

Figure 3A:
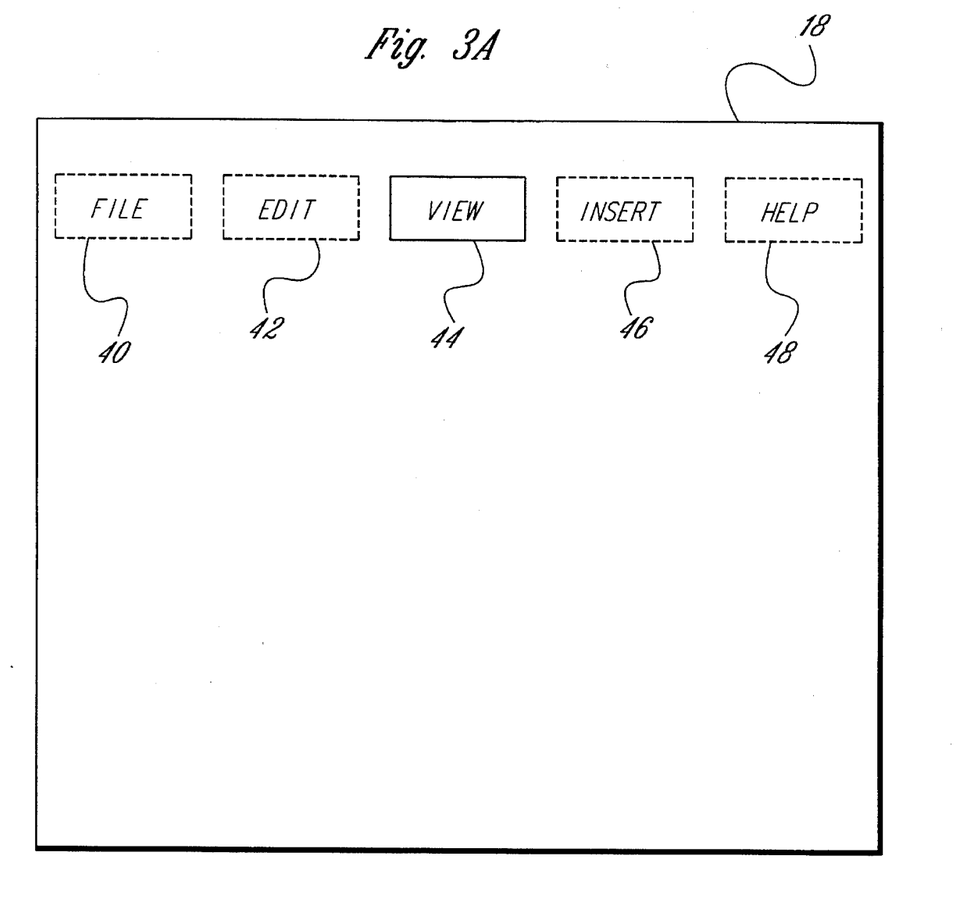
FIG. 3A shows a computer-controlled display using the system of FIG. 2.

The first navigation function, the Tabbing mode, causes a screen highlight to jump from a present hot spot to a new hot spot in the direction indicated by the four direction control button 12. If the user depresses one of the four arrow button portions of the four direction control button 12, the computer 16 will cause the screen highlight to move from one hot spot to another hot spot. This allows the user to focus on the functions associated with the selected hot spot. In the example of FIG. 3A, there are several hot spots associated with a typical application program. There is a FILE hot spot 40, an EDIT hot spot 42, a VIEW hot spot 44, an INSERT hot spot 46, and a HELP hot spot 48. In this example, the focus is currently on the VIEW hot spot 44 as indicated by the solid line around the hot spot. In practice there are many ways to indicate which hot spot has the focus. For example, reverse video, bold characters or the like may be used to indicate the current focus. If the computer-controlled display 18 is a color video display, a different color may be used to indicate the current focus. The technique described herein for indicating the current focus should not be considered a limitation on the present invention.

If the user wishes to open a file, the user presses the left arrow button portion of the four direction control button 12. When the left arrow button portion of the four direction control button 12 is pressed the first time, the focus shifts from the VIEW hot spot 44 to the EDIT hot spot 42. Pressing the left arrow button portion of the four direction control button 12 a second time will cause the focus to shift from the EDIT hot spot 42 to the FILE hot spot 40.

Figure 3B:
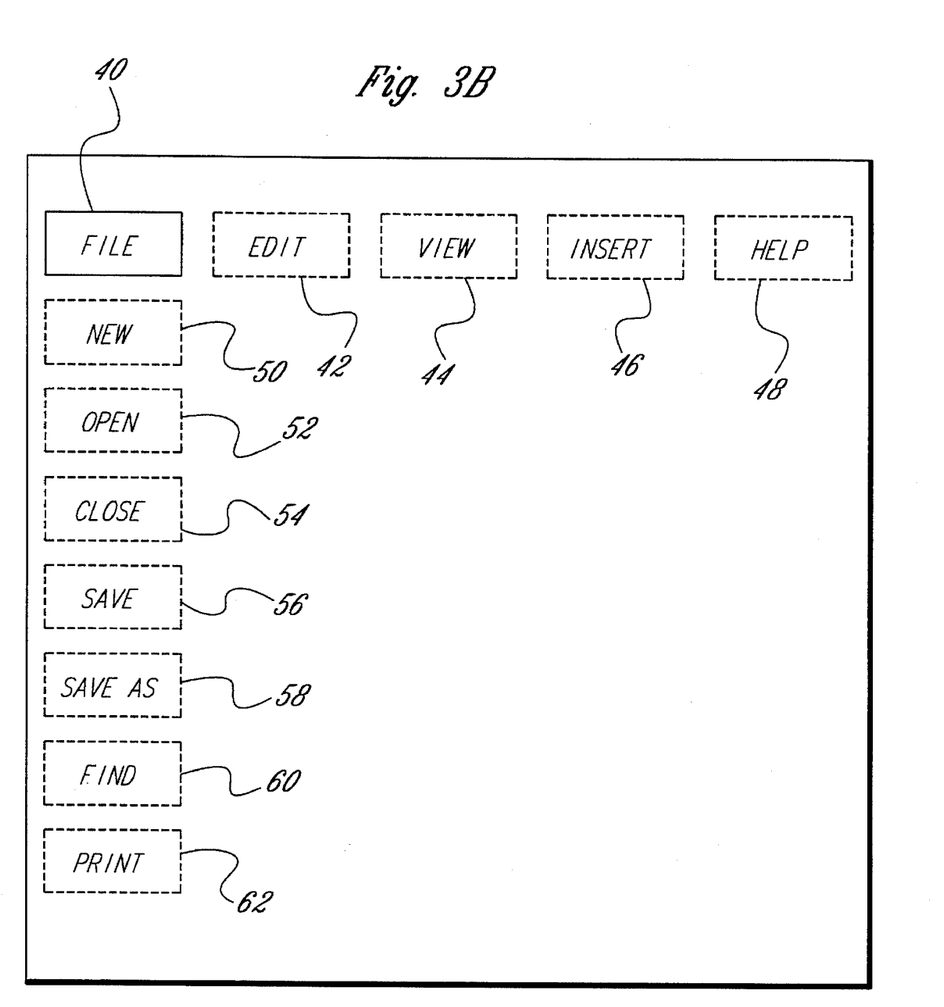
FIG. 3B shows a computer-controlled display following the selection of a function shown in the display of FIG. 3A.

The user may activate the functions associated with the FILE hot spot 40 by pressing the function control button 14, as described above. When the user activates the FILE hot spot 40, the computer 16 will take action based on the focused hot spot and cause the contents of the computer-controlled display 18 to change as shown in FIG. 3B. In the display shown in FIG. 3B, additional hot spots are created for functions associated with a computer file. In the example of FIG. 3B, there is a NEW hot spot 50, an OPEN hot spot 52, a CLOSE hot spot 54, a SAVE hot spot 56, a SAVE AS hot spot 58, a FIND hot spot 60, and a PRINT hot spot 62. Each of these hot spots are associated with functions that are specific to the particular application program running on the computer 16.

To open a file, the user presses the down arrow button portion of the four direction control button 12 two times to move the focus from the FILE hot spot 40 to the OPEN hot spot 52. As described above, the functions associated with the focused hot spot may be selected by depressing the function control button 14. Obviously, the examples presented above relate to a specific type of application program running on the computer 16. However, the present invention may be used with any type of application program running on the computer. The system 9 allows the user to navigate through any application program with a minimum of computer controls and a minimum of computer operation experience.

Figure 4A:
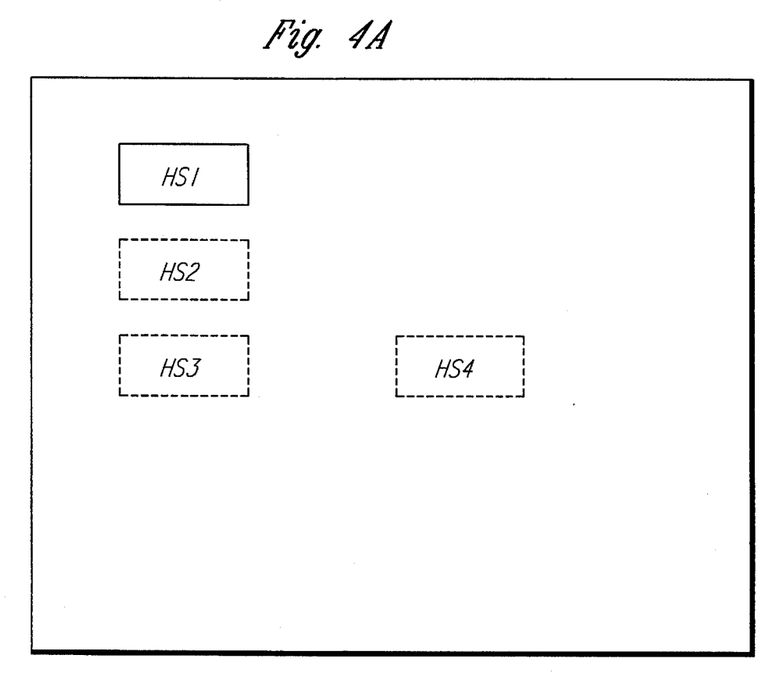
FIGS. 4A–4E show decision criteria used by the system of FIG. 2 to determine which hot spot receives the focus.

The system 9 allows movement from one hot spot to another in a predefined fashion using three different movement criteria. If the user depresses one of the four arrow button portions of the four direction control button 12, the system 9 determines whether the newly selected direction is the opposite direction of the previously selected direction. If so, the computer 16 changes the focus back to the previously focused hot spot based on the first of the three decision criteria. For example, in FIG. 4A, four hot spots HS1, HS2, HS3, and HS4 are displayed on the computer-controlled display 18. If the system 9 is focused on the hot spot HS1 and the user selects the right arrow button portion of the four direction control button 12, the computer 16 will change the focus from the host spot HS1 to the hot spot HS4. However, if the user now selects the left arrow button portion of the four direction control button 12, the computer 16 will not move to the nearest hot spot HS3 to the left of the hot spot HS4, but instead returns to the previously focused hot spot HS1. Thus, the system 9 allows the user to easily return to the previously focused hot spot by reversing directions on the four direction control button 12.

Figure 4B:
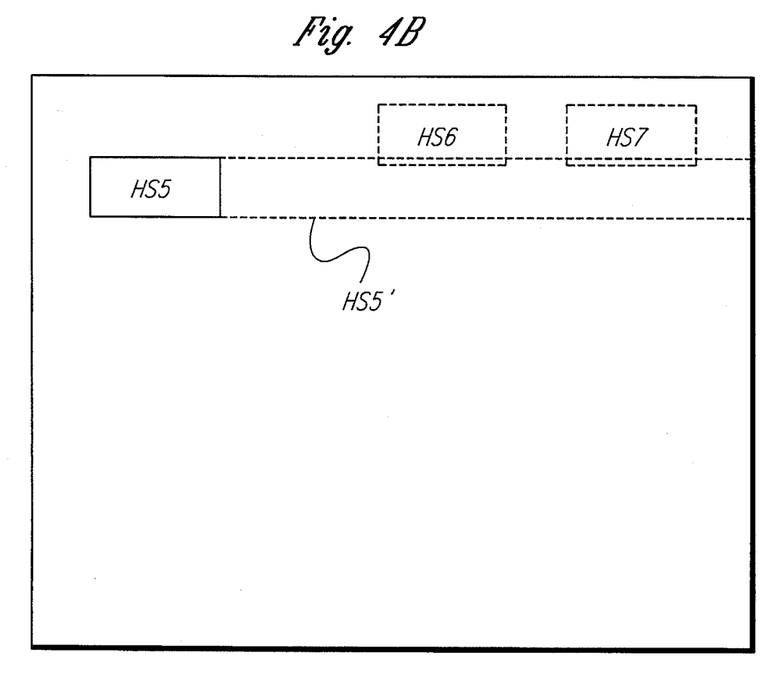

The second decision criteria is applied if the presently selected direction is not the reverse of the previously selected direction. The system 9 then looks for the nearest adjacent hot spot in the selected direction. In FIG. 4B, for example, if the focus is presently on the hot spot HS5 and the user selects the right arrow button portion of the four direction control button 12 (assuming that the last direction selected was not the left arrow button portion of the four direction control button 12), the computer 16 will cause the focus to shift to the hot spot HS6 immediately to the right of the hot spot HS5. Thus, the focus shifts to the adjacent hot spot HS6 in the selected direction.

Figure 4C:
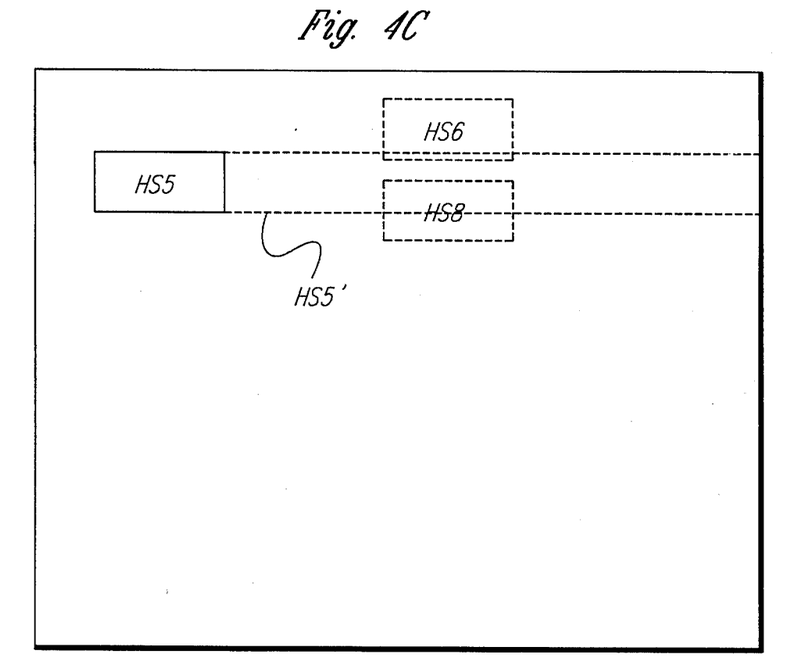

To perform this function, the system 9 causes the rectangle surrounding the hot spot HS5 to stretch out in the selected direction. The computer 16 then checks for an intersection between the stretched rectangle HS5' and any hot spot. If more than one hot spot is intersected by the stretched rectangle HS5', the hot spot nearest the focused hot spot is selected. In the example of FIG. 4B, the hot spot HS6 is closer to the focused hot spot HS5 than the hot spot HS7. Therefore, the hot spot HS6 is selected, and the focus now moves to the hot spot HS6. If there is a tie between two or more hot spots, the hot spot with the greatest area of intersection with the stretched rectangle will receive the focus. In the example shown in FIG. 4C, the hot spot HS6 and another hot spot HS8 are equally distant from the focused hot spot HS5. However, the hot spot HS8 has a greater area of intersection with the stretched rectangle HS5'. Therefore, the hot spot HS8 will receive the focus. In the unlikely event that the area of intersection with the stretched rectangle is equal, the system 9 selects the top hot spot when the selected direction is horizontal, and the right hot spot if the selected direction is vertical.

Figure 4D:
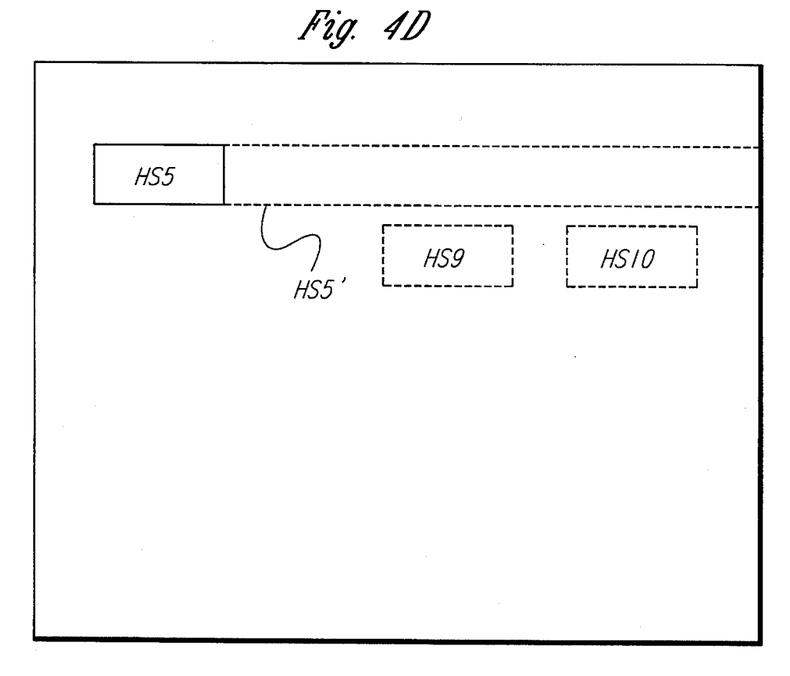

Finally, if there is no intersection of a hot spot with the stretched rectangle, the third decision criteria dictates that the hot spot closest to the stretched rectangle in the selected direction receive the focus. As shown in FIG. 4D, if the user selected the right arrow button portion of the four direction control button 12, no hot spots intersect with the stretched rectangle HS5' of the hot spot HS5. There are two hot spots HS9 and HS10 to the right of the focused hot spot HS5. However, the hot spot HS9 is closer to the stretched rectangle HS5' of the focused hot spot HS5 in the selected direction. Thus, hot spot HS9 will receive the focus.

Figure 4E:
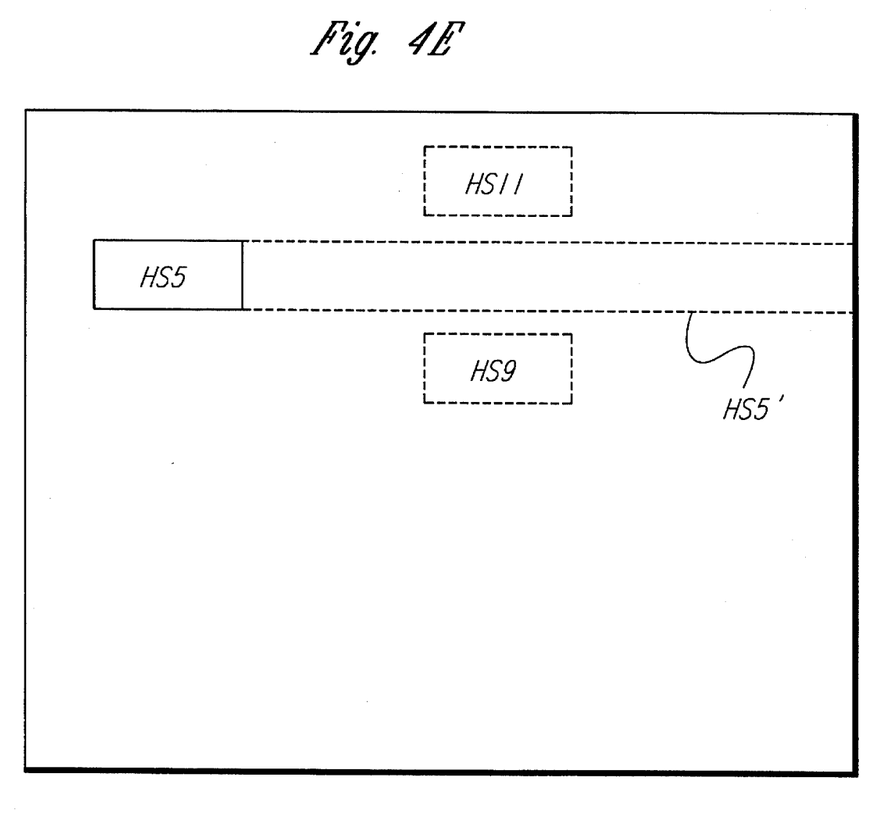

In the event that hot spots are equally distant from the focused hot spot in the selected direction, the hot spot nearest the stretched rectangle in the direction perpendicular to the selected direction receives the focus. As shown in FIG. 4E, the hot spot HS9 and another hot spot HS11 are equally distant from the stretched rectangle HS5' of the focused hot spot HS5 in the selected direction. However, hot spot HS9 is closer to the stretched rectangle HS5' in the direction perpendicular to the selected direction and thus receives the focus. In the unlikely event of a tie, the hot spot on the top receives the focus if the selected direction is horizontal while the hot spot on the right receives the focus if the selected direction is vertical.

It is obvious to those of skill in the art that the decision criteria described above are only examples of the many possible decision criteria that may be used to determine which hot spot will receive the focus. Therefore, the examples presented above should not be considered limitations on the present invention.

Hot spots can also be used to select the desired direction of cursor movement on the computer-controlled display 18. A four direction movement indicator 36 (see FIG. 1) is displayed on the computer-controlled display 18 as four separate hot spots. Each direction on the four direction movement indicator 36 is a separate hot spot. The user may select one hot spot of the four direction movement indicator 36 hot spot in the manner described above. The selected one of the four directions of the four direction movement indicator 36 will be highlighted to indicate the desired direction of movement. For example, to select the "down" direction for cursor movement, the user depresses one or more of the four arrow button portions of the four direction control button 12 to select the down arrow hot spot displayed on the four direction movement indicator 36. Depressing the function control button 14 while the hot spot is focused on the down arrow of the four direction movement indicator 36 causes the cursor to move in the down direction on the computer-controlled display 18. Each time the user depresses the function control button 14, the computer 16 moves the cursor on the computer-controlled display 18 one unit of distance in the direction highlighted on the four direction movement indicator 36. In the example above, if the user changes the desired direction of cursor movement from "down" to "fight," the computer 16 will move the cursor to the right one unit of distance each time the user depresses the function control button 14.

It should be noted that the unit of distance may be suitably selected for a particular program or the contents of a particular program state on the computer-controlled display 18. The unit of distance may be measured in pixels or any other suitable units of measurement. For example, in one screen mode the computer 16 could move the cursor a fixed number of pixels each time the user depresses the function control button 14. If the computer-controlled display 18 is in a magnified mode, for example, the computer 16 may move the cursor a smaller number of pixels each time the user depresses the function control button 14.

Alternatively, the system 9 can be configured so that the user can hold the function control button 14 in the depressed position causing the computer 16 to continuously move the cursor in the highlighted direction at a predetermined rate. When the cursor is at the desired location, the user can release the function control button 14 to stop the movement. Similarly, if the focus is on a hot spot other than a direction arrow hot spot of the direction movement indicator 36, holding the function control button 14 in the depressed position will cause the application program running on the computer 16 to continuously repeat the specific action associated with the focused hot spot.

The above-description depicts the cursor movement in response to the selection of a hot spot on the four direction movement indicator 36. Cursor movement in response to the selection of a hot spot on the four direction movement indicator 36 is, of course, completely dependent on the particular application program running on the computer 16. Alternatively, depressing the function control button 14 while the focus is on a hot spot on the four direction movement indicator 36 may cause the application program to take some different action other than the movement of the cursor. For example, if an application program running on the computer 16 has multiple menus, depressing the function control button 14 while the focus is on the four direction movement indicator 36 may cause the application program to change menus.

The second navigation function, the Random Roam mode, uses the same hand-held controller 10 and the four direction control button 12 to make the hand-held controller operate somewhat like a mouse. While the Tabbing mode causes the focus to jump from one hot spot to the next, the Random Roam mode causes the cursor or focus on the computer-controlled display 18 to move in a uniform incremental manner across the screen in the direction selected by the arrow button portions of the four direction control button 12. If the user momentarily depresses one of the arrow button portions of the four direction control button 12, the computer 16 will cause the cursor to move a short distance in the selected direction. However, if the user holds one of the arrow button portions of the four direction control button 12 in the depressed position, the computer 16 will cause the cursor to continuously move at a predetermined rate in the selected direction. The system 9 allows the application program running on the computer 16 to adjust the predetermined rate. The user may change focus from one hot spot to another hot spot by using the four direction control button 12 in the Random Roam mode to move the cursor to a hot spot. When the focus is on a hot spot, the user can enable the function associated with that hot spot by pressing the function control button 14, as described above.

The above description of the Tabbing mode and the Random Roam mode provides details of operation when a single one of the four arrow button portion of the four direction control button 12 is selected. The principles of the present invention may by applied to a system 9 in which two of the four arrow button portions of the four direction control button 12 are simultaneously selected. The two arrow button portions may not, of course, indicate opposite directions. That is, the user may not simultaneously select both left and right directions. However, the user may simultaneously select the "right" and "down" directions by pressing both the right and down arrow button portions of the four direction control button 12. The system 9 operates in the manner described above except that the cursor will simultaneously move in both of the selected directions.

Figure 5:
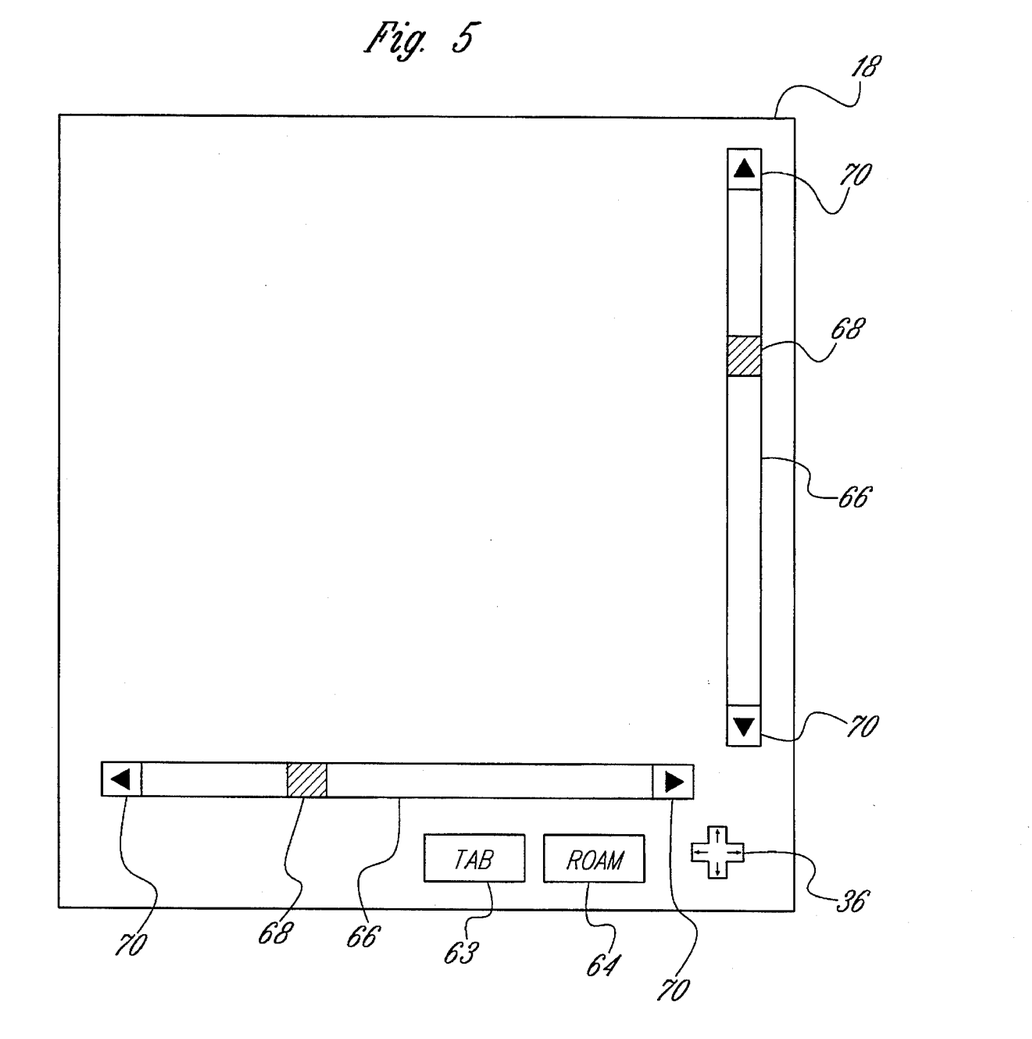
FIG. 5 shows techniques used by the system of FIG. 2 for scrolling a file on the computer-controlled display.

In an alternative embodiment, the computer-controlled display 18 may contain hot spots to switch between the Tabbing mode and the Random Roam mode, as shown in FIG. 5. The computer-controlled display 18 contains a TAB mode hot spot 63 and a ROAM mode hot spot 64. The user selects the desired mode by changing the focus to the TAB mode hot spot 63 or the ROAM mode hot spot 64 and depressing the function control button 14.

The third navigation function, the Power mode, uses the hand-held controller 10 navigate quickly around the computer-controlled display 18 or select functions. For example, the Power mode may be used when the application program provides scrollbars 66 or a four direction movement indicator 36, as seen in FIG. 5. The scrollbars 66 each have a position indicator 68 to show the relative horizontal and vertical position of the cursor in the file displayed on the computer-controlled display 18. At each end of the scrollbars are opposing direction arrow hot spots 70. To scroll a file vertically in the downward direction, for example, the user focuses on the down arrow hot spot 70 of the vertical scrollbar 66 as described above for the Tabbing mode or the Random Roam mode. In the Tabbing mode or Random Roam mode, the user must depress the function control button 14 while the focus is on the down arrow hot spot 70 to scroll the file.

To change directions in the Tabbing mode or the Random Roam mode, the user must change the focus from the down arrow hot spot 70 to the up arrow hot spot using the four direction control button 12. However, to simplify the scrolling process, the Power mode allows the user to change directions without having to stop scrolling and change the focus from one direction arrow hot spot 70 to another direction arrow hot spot 70. In the example above where the user is scrolling a file in the downward direction, the user could use the Power mode by depressing both the four direction control button 12 and the function control button 14. The user may hold the function control button 14 in the depressed position and use the up and down arrow button portions of the four direction control button 12 to change the scrolling direction back and forth between the up and down directions. The scrolling occurs at a predetermined rate and in the up or down direction, whichever arrow button portion is depressed. If the user switches to scroll left or fight, it is necessary to change the focus from the vertical scrollbar 66 to the horizontal scrollbar 66. The Power mode operates in the fashion described above, but with the left and right arrow button portions of the four direction control button 12.

If the application program provides a four direction movement indicator 36, the system 9 can use the Power mode to scroll in any direction without having to stop to change directions. The user must change the focus to one of the direction hot spots on the four direction movement indicator 36. If the user then depresses the function control button 14 to move in the selected direction. To use the Power mode, the user maintains the function control button 14 in the depressed position and presses one of the arrow button portions of the four direction control button 12 to scroll in that direction. When the user changes the direction of scrolling, the focus changes to the appropriate hot spot to provide the user with a visual indication of the scrolling direction. If the focus is one of the direction hot spots of the four direction movement indicator 36, the user may also depress two of the arrow button portions of the four direction control button 12 to scroll diagonally through a file.

If the user releases either the four direction control button 12 or the function control button 14, the computer 16 will change modes correspondingly. For example, the user is depressing both the four direction control button 12 and the function control button 14 to use the Power mode. If the user then releases the four direction control button 12, the computer 16 changes back to the Tabbing mode or the Random Roam mode described above. Similarly, releasing the four direction control button 12 will cause the computer to switch back to scrolling in the last direction selected in the Power mode. The user can change scrolling directions as described above for the Tabbing mode or the Random Roam mode, or may reenter the Power mode by again depressing an arrow button portion of the four direction control button 12 while continuing to depress the function control button 14.

Alternatively, the Power mode may be used to navigate through a plurality of parameter values and select a particular parameter value. For example, the Power mode may be used to select a color from a color pattern by depressing both the function control button 14 and the four direction control button 12 to move the cursor or screen highlight to the desired color. When the function control button 14 is released, the indicated color is automatically selected.

Figure 6A:
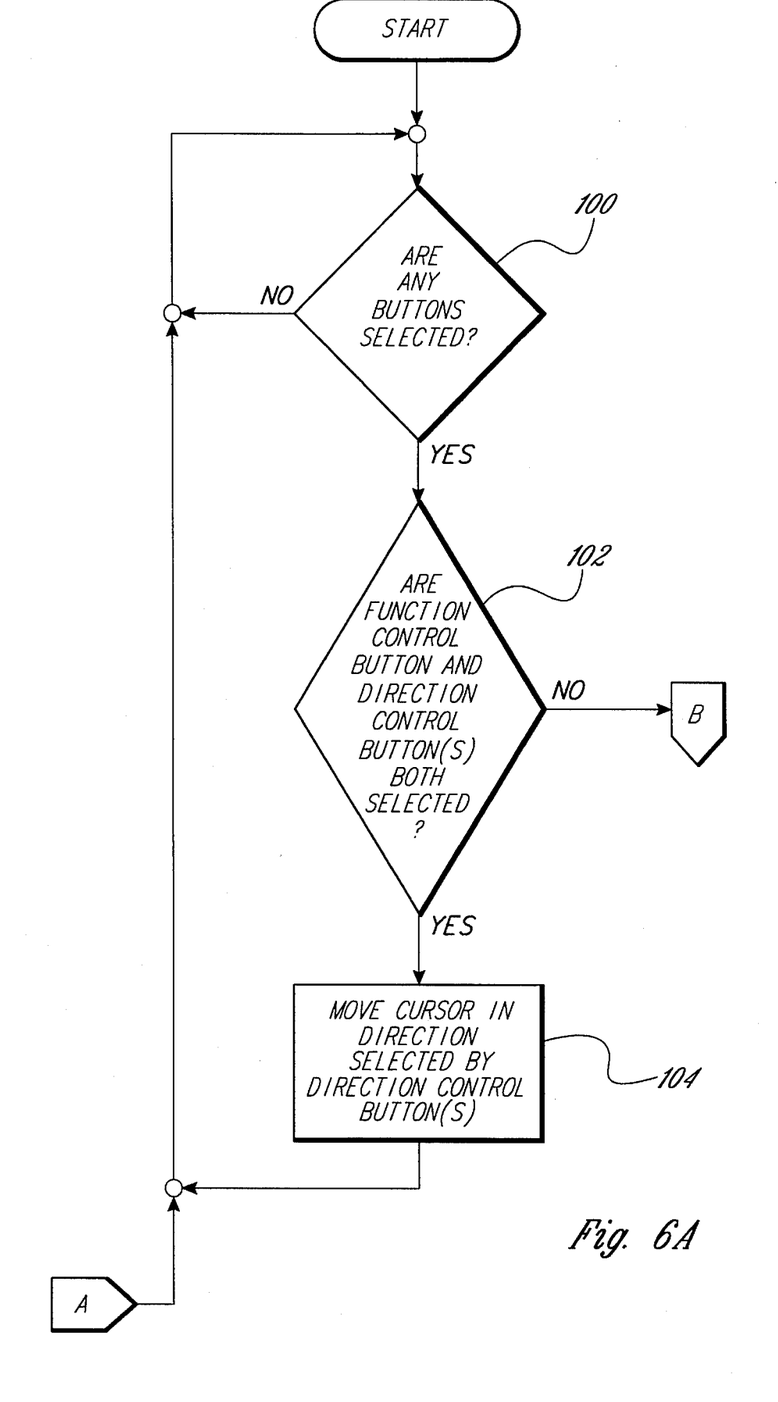
FIGS. 6A and 6B are flow charts of the system of FIG. 2.
Figure 6B:
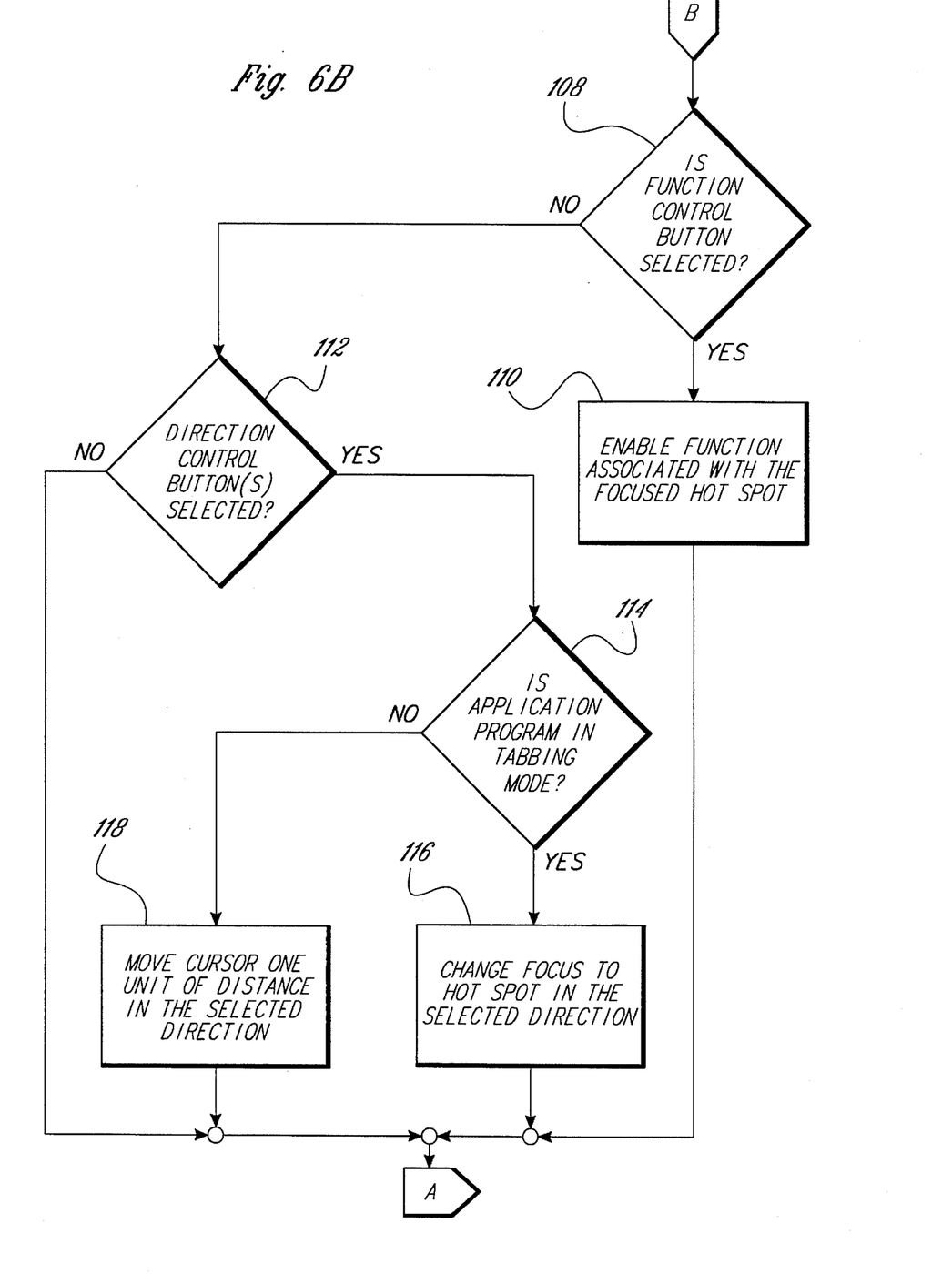

The flow chart of FIGS. 6A and 6B illustrate the inventive method. At the start in decision block 100 in FIG. 6A, the computer 16 checks to see if any buttons on the four direction control button 512 or the function control button 14 are selected. If no buttons are selected, the result of decision block 100 is NO, and the computer loops back until a button is selected. If any buttons on the hand-held controller 10 are selected, the result of decision block 100 is YES. In that event, the computer 16 in decision block 102 checks to see if the four direction control button 12 and the function control button 14 are both selected. If the four direction control button 12 and the function control button 14 are both selected, the result of decision block 102 is YES. In that event the Power mode has been selected by the user. The computer 16 in step 104 moves the cursor one unit of distance in the direction selected by the arrow button portions on the four direction control button 12. The computer then returns to decision block 100 described above.

Note that if the user continues to depress both the four direction control button 12 and the function control button 14, the computer 16 will remain in the control loop described above. The cursor appears to move continuously on the computer-controlled display 18. The computer 16 may include a delay to limit the maximum rate of cursor movement to the predetermined rate if the four direction control button 12 and the function control button 14 are both selected. This type of delay is well known and will not be discussed herein.

If the four direction control button 12 and the function control button 14 are not both depressed, the result of decision block 102 is NO, and the computer 16 in decision block 108, shown in FIG. 6B, determines if the function control button 14 is selected. If the function control button 14 is selected, the result of decision block 108 is YES, and in step 110, the computer 16 enables the function associated with the focused hot spot. As discussed above, the specific action taken by the computer 16 depends on the particular application program running on the computer. Following step 110, the computer 16 returns control to decision block 100 in FIG. 6A.

If the function control button 14 is not selected, the result of decision block 108 is NO, and in decision block 112, the computer 16 determines if an arrow button portion of the four direction control button 12 is selected. If no arrow button portion of the four direction control button 12 is selected, the result of decision block 112 is NO, and the computer returns to the start at decision block 100 in FIG. 6A. If an arrow button portion of the four direction control button 12 is selected, the result of decision block 112 is YES. In that event, the computer 16 in decision block 114 determines if the application program is operating in the Tabbing mode. If the application program is operating in the Tabbing mode, the result of decision block 114 is YES, and in step 116 the computer changes the focus to a different hot spot in the direction indicated by the four direction control button 12. Note that the system 9 may apply one of the three decision criteria described above to determine which hot spot will receive the focus. Following step 116, the computer 16 returns control to decision block 100 in FIG. 6A.

If the application program is not operating in the Tabbing mode, the result of decision block 114 is NO. In that event, the computer 16 in step 118 moves the cursor one unit of distance in the selected direction. Following step 118, the computer 16 returns control to decision block 100 in FIG. 6A.

Note that the control loops described in FIG. 6B could also be repeated by holding the four direction control button 12 or the function control button 14 in the depressed position. Whether these actions are repeated depends on the application program running on the computer 16.

Thus, the present invention provides a simple system and method for navigating through an application program running on the computer 16. All three navigation functions are controlled by the same hand-held controller 10, which switches easily between modes. The specific actions taken by the application program are dependent on the program. However, once the user becomes accustomed to the operation of the present invention and can apply this knowledge to any application program running on the computer.

It is to be understood that even though various embodiments and advantages of the present invention have been set forth in the foregoing description, the above disclosure is illustrative only, and changes may be made in detail and yet remain within the broad principles of the present invention. Therefore, the present invention is to be limited only by the appended claims.

We claim:

1. A system for controlling the navigation through a computer application program running on a host computer, the host computer coupled to a computer-controlled display displaying a plurality of hot spots, the system comprising:

a hand-held remote controller sized to fit within one hand and able to operate in a plurality of operational modes;

a first direction control button on said hand-held controller, having first and second positions and a resting position, and selectively controlling the movement of a cursor to jump from one of the plurality of hot spots to a second of the plurality of hot spots in a first dimension if the application program is operating in a first of said plurality of operational modes, and controlling the uniform incremental movement of said cursor from a present display position to adjacent display positions in said first dimension if the application program is operating in a second of said plurality of operational modes, said first and second positions indicating the desired direction of movement of said cursor in first and second directions in said first dimension, said resting position indicating the selection of no movement of said cursor in said first dimension;

a second direction control button on said hand-held controller, having first and second positions and a resting position, and selectively controlling the movement of said cursor from said one hot spot to a second of the plurality of hot spots in a second dimension if the application program is operating in said first operational mode, and controlling the uniform incremental movement of said cursor from said present display position to an adjacent display position in said second dimension if the application program is operating in said second operational mode, said first and second positions indicating the desired direction of movement of said cursor in first and second directions in said second dimension, said resting position indicating the selection of no movement of said cursor in said second dimension;

a function select button on said hand-held controller having first and second positions and controlling first and second computer functions, said first computer function enabling an action associated with a particular hot spot when said cursor is focused on said particular hot spot on the computer-controlled display and said function select button is in said second position, said second computer function operating in conjunction with said first and second direction control buttons to control the movement of said cursor when said function select button is in said second position and either said first or said second direction control button is not in said resting position; and a transmitter within said hand-held controller to transmit data concerning the position of said first and second direction control buttons and said function select button from said hand-held controller to the host computer.

2. The system of claim 1 wherein said action is repeatedly enabled by maintaining said function select button in said second position.

3. The system of claim 1 wherein said first and second direction control buttons comprise a four directional control button, the four directions of said four directional control button comprising said first and second directions in said first dimension and said first and second directions in said second dimension, said resting position indicating the selection of no movement of said cursor in said first or second dimension.

4. The system of claim 1 wherein cursor movement in both said first and second dimensions is selected by selecting either said first or second direction in said first dimension and either said first or second direction in said second dimension by selecting either said first or said second position of said first direction control button and selecting either said first or said second position of said second direction control button.

5. The system of claim 1, further including a receiver circuit within the host computer receiving said transmitted data, the host computer using said transmitted data to determine the position of said first and second direction control buttons and said function select button from said hand-held controller.

6. The system of claim 5 wherein said transmitter is a radio frequency transmitter, said receiver being a radio frequency receiver.

7. The system of claim 5 wherein said transmitter is an infrared transmitter, said receiver being an infrared receiver.

8. The system of claim 1, further including a direction indicator hot spot on the computer-controlled display screen to indicate a selected direction of cursor movement.

9. The system of claim 8 wherein said selected direction of cursor movement is altered by selecting either said first or said second position of said first direction control button or said first or said second position of said second direction control button while selecting said second computer function, said direction indicator hot spot being altered to indicate said selected direction of cursor movement.

10. The system of claim 1 wherein said cursor continuously moves in the direction selected by said first or second direction control buttons while said function select button is in said first position if the application program is in said second operational mode.

11. A system for controlling the navigation through a computer application program running on a host computer, the host computer coupled to a computer-controlled display displaying a plurality of hot spots, the system comprising:

a first direction control button having first and second positions and a resting position, and selectively controlling the movement of a cursor from one of the plurality of hot spots to a second of the plurality of hot spots in a first dimension if the application program is operating in a first of said plurality of operational modes, and controlling the movement of said cursor from a present display position to an adjacent display position in said first dimension if the application program is operating in a second of said plurality of operational modes, said first and second positions indicating the desired direction of movement of said cursor in first and second directions in said first dimension, said resting position indicating the selection of no movement of said cursor in said first dimension;

a second direction control button having first and second positions and a resting position, and selectively controlling the movement of said cursor from said one hot spot to a second of the plurality of hot spots in a second dimension if the application program is operating in said first operational mode, and controlling the movement of said cursor from said present display position to an adjacent display position in said second dimension if the application program is operating in said second operational mode, said first and second positions indicating the desired direction of movement of said cursor in first and second directions in said second dimension, said resting position indicating the selection of no movement of said cursor in said second dimension; and a function select button having first and second positions and controlling first and second computer functions, said first computer function enabling an action associated with a particular hot spot when said cursor is focused on said particular hot spot on the computer-controlled display and said function select button is in said second position, said second computer function operating in conjunction with said first and second direction control buttons to control the movement of said cursor when said function select button is in said second position and either said first or said second direction control is not in said resting position.

12. The system of claim 11 wherein said action is repeatedly enabled by maintaining said function select button in said second position.

13. The system of claim 11 wherein cursor movement in both said first and second dimension is selected by selecting either said first or second direction in said first dimension and either said first or second direction in said second dimension.

14. The system of claim 11 wherein said first and second direction control buttons comprise a four directional control button, the four directions of said four directional control button comprising said first and second directions in said first dimension and said first and second directions in said second dimension, said resting position indicating the selection of no movement of said cursor in said first or second dimension.

15. The system of claim 14 wherein cursor movement in both said first and second dimension is selected by selecting either said first or second direction in said first dimension and either said first or second direction in said second dimension.

16. The system of claim 14, further including a transmitter to transmit data concerning the position of said first and second direction control buttons and said function select button to the host computer.

17. The system of claim 16, further including a receiver circuit within the host computer receiving said transmitted data, the host computer using said transmitted data to determine the position of said first and second direction control buttons and said function select button.

18. The system of claim 17 wherein said transmitter is a radio frequency transmitter, said receiver being a radio frequency receiver.

19. The system of claim 17 wherein said transmitter is an infrared transmitter, said receiver being an infrared receiver.

20. The system of claim 11, further including a direction indicator hot spot on the computer-controlled display screen to indicate the selected direction of cursor movement.

21. The system of claim 20 wherein said direction indicator hot spot is a direction arrow on a scrollbar.

22. The system of claim 20 wherein said selected direction of cursor movement is altered by selecting said first or said second position of said first direction control button or said first or said second position of said second direction control button while selecting said second computer function, said direction indicator hot spot being altered to indicate said selected direction of cursor movement.

23. The system of claim 11 wherein said cursor continuously moves in the direction selected by said first or second cursor direction control buttons while said function select button is in said first position if the application program is in said second operational mode.

24. In a host computer system coupled to a computer-controlled display, a method for controlling the navigation through a computer application program running on the host computer, the computer-controlled display displaying a plurality of hot spots, the method comprising the steps of:

(a) determining the position of a first direction control button on a remote hand-held controller, said first direction control button having first and second positions and a resting position, and selectively controlling the movement of a cursor from one of the plurality of hot spots to a second of the plurality of hot spots in a first dimension if the application program is operating in a first of said plurality of operational modes, and controlling the movement of said cursor from a present display position to an adjacent display position in said first dimension if the application program is operating in a second of said plurality of operational modes, said first and second positions indicating the desired direction of movement of said cursor in first and second directions in said first dimension, said resting position indicating the selection of no movement of said cursor in said first dimension;

(b) determining the position of a second direction control button on said hand-held controller, said second direction control button having first and second positions and a resting position, and selectively controlling the movement of said cursor from said one hot spot to a second of the plurality of hot spots in a second dimension if the application program is operating in said first operational mode, and controlling the movement of said cursor from said present display position to an adjacent display position in said second dimension if the application program is operating in said second operational mode, said first and second positions indicating the desired direction of movement of said cursor in first and second directions in said second dimension, said resting position indicating the selection of no movement of said cursor in said second dimension;

(c) determining the position of a function select button on said hand-held controller, said function select button having first and second positions and controlling first and second computer functions, said first computer function enabling an action associated with a particular hot spot when said cursor is focused on said particular hot spot on the computer-controlled display and said function select button is in said second position, said second computer function operating in conjunction with said first and second direction control buttons to control the movement of said cursor when said function select button is in said second position and either said first or said second direction control is not in said resting position;

(d) transmitting data concerning the position of said first and second direction control buttons and said function select button from said hand-held controller to the host computer; and (e) receiving said transmitted data and moving said cursor or enabling said associated action depending on the position of said function select button.

25. The method of claim 24 wherein directions in both said first and second dimensions are selected by selecting said first or said second position of said first direction control button and said first or said second position of said second direction control button, said step (d) of transmitting data transmitting data indicating the selection of directions in both said first and said second dimension.

26. The method of claim 24 wherein step (e) of enabling said associated action is repeated if said function select button is maintained in said second position.

27. The method of claim 24, further including the step of:
(f) displaying a direction indicator hot spot on the computer-controlled display screen to indicate the selected direction of cursor movement.

28. The method of claim 27, further including the step of:
(g) changing said direction indicator hot spot to indicate said selected direction of cursor movement when said selected direction of cursor movement is altered by said steps (a)–(f).

29. The method of claim 24 wherein said step (e) moves the cursor continuously in the direction determined by said steps (a)–(b) if said first or second cursor direction control buttons is continuously maintained in a position other than said resting position while said function select button is in said first position and the application program is in said second operational mode.

30. In a host computer system coupled to a computer-controlled display, a method for controlling the navigation through a computer application program running on the host computer, the computer-controlled display displaying a plurality of hot spots, the method comprising the steps of:

(a) determining the position of a first direction control button on a remote hand-held controller, said first direction control button having first and second positions and a resting position, and selectively controlling the movement of a cursor from one of the plurality of hot spots to a second of the plurality of hot spots in a first dimension if the application program is operating in a first of said plurality of operational modes, and controlling the movement of said cursor from a present display position to an adjacent display position in said first dimension if the application program is operating in a second of said plurality of operational modes, said first and second positions indicating the desired direction of movement of said cursor in first and second directions in said first dimension, said resting position indicating the selection of no movement of said cursor in said first dimension;

(b) determining the position of a second direction control button on said hand-held controller, said second direction control button having first and second positions and a resting position, and selectively controlling the movement of said cursor from said one hot spot to a second of the plurality of hot spots in a second dimension if the application program is operating in said first operational mode, and controlling the movement of said cursor from said present display position to an adjacent display position in said second dimension if the application program is operating in said second operational mode, said first and second positions indicating the desired direction of movement of said cursor in first and second directions in said second dimension, said resting position indicating the selection of no movement of said cursor in said second dimension;

(c) determining the position of a function select button on said hand-held controller, said function select button having first and second positions and controlling first and second computer functions, said first computer function enabling an action associated with a particular hot spot when said cursor is focused on said particular hot spot on the computer-controlled display and said function select button is in said second position, said second computer function operating in conjunction with said first and second direction control buttons to control the movement of said cursor when said function select button is in said second position and either said first or said second direction control is not in said resting position; and (d) moving said cursor or enabling said associated action depending on the position of said function select button.

31. A hand-held remote controller for controlling the navigation through a computer application program running on a host computer, the host computer coupled to a computer controlled display displaying a cursor, the system comprising:

a four direction control button on the hand-held controller to selectively control the movement of the cursor on the display, said four direction control button having a resting position indicating the selection of no movement of the cursor and being operable to select vertical and horizontal movement of the cursor, said four direction control button causing the cursor to move in incremental steps from a current display position on the display to a new display position adjacent to said current display position if the application program is in a first operational mode, and causing the cursor to jump from said current display position at one of a plurality of hot spots on the display to said new display position at a second of said plurality of hot spots if the application program is in a second operational mode; and a function control button on the hand-held controller having an enabled position and controlling first and second control functions, said first control function operating in conjunction with said four direction control button to control movement of the cursor when said function control button is in said enabled position and said four direction control button is not is said resting position, said second control function enabling an action associated with said current display position by placing said function control button in said enabled position.

32. The system of claim 11, further including user-selectable means for alternatively selecting said first operational mode or said second operational mode.

33. The method of claim 30, further including the step of alternatively selecting said first operational mode or said second operational mode.

34. The system of claim 31, further including user-selectable means for alternatively selecting said first operational mode or said second operational mode.

* * * * *